US012270519B1

(12) United States Patent
Li

(10) Patent No.: US 12,270,519 B1
(45) Date of Patent: Apr. 8, 2025

(54) LIGHT-EMITTING DIODE (LED) LIGHT BAR AND FLEXIBLE NEON LAMP

(71) Applicant: Shiwen Li, Guangdong (CN)

(72) Inventor: Shiwen Li, Guangdong (CN)

(*) Notice: Subject to any disclaimer, the term of this patent is extended or adjusted under 35 U.S.C. 154(b) by 0 days.

(21) Appl. No.: 18/956,449

(22) Filed: Nov. 22, 2024

(51) Int. Cl.
*F21S 4/26* (2016.01)

(52) U.S. Cl.
CPC .................................... *F21S 4/26* (2016.01)

(58) Field of Classification Search
CPC .................................... F21S 4/00; F21S 4/26
See application file for complete search history.

(56) References Cited

U.S. PATENT DOCUMENTS 10,876,689 B1 * 12/2020 Bowser .................... F21V 9/30
2004/0085762 A1 * 5/2004 Iwasa ..................... F21S 2/00
362/217.17
2021/0302012 A1 * 9/2021 Vasylyev ................ F21V 13/14

FOREIGN PATENT DOCUMENTS

CN 110094655 A * 8/2019
CN 210740010 U * 6/2020 .............. F21K 9/20
DE 202005014624 U1 * 3/2007 ............. F21S 10/02
DE 102015218491 A1 * 9/2016 .............. F21S 4/22

OTHER PUBLICATIONS

Innovation q+ npl search (Year: 2024).*

* cited by examiner

*Primary Examiner* — Anabel Ton
(74) *Attorney, Agent, or Firm* — Daniel M. Cohn

(57) ABSTRACT

A light-emitting diode (LED) light bar capable of refracting and scattering LED light and a flexible neon lamp are provided. The LED light bar includes a flexible light shielding sleeve, a flexible scattering layer, and a flexible light strip. The flexible light shielding sleeve extends along the LED light bar, the flexible light strip is disposed in the flexible scattering layer. A light emitting direction of the flexible light strip is opposite to an illumination direction of the LED light bar. The flexible scattering layer extends along the flexible light shielding sleeve and is disposed between the flexible light strip and the flexible light shielding sleeve. The LED light emitted by the flexible light strip undergoes multiple reflections and refractions within the flexible scattering layer, and a light reflecting surface of the flexible light shielding sleeve is additionally provided to improve light reflection efficiency.

20 Claims, 14 Drawing Sheets

LIGHT-EMITTING DIODE (LED) LIGHT BAR AND FLEXIBLE NEON LAMP

TECHNICAL FIELD

The present disclosure relates to a technical field of decorative lighting devices, and in particular to a light-emitting diode (LED) light bar capable of refracting and scattering LED light and a flexible neon lamp.

BACKGROUND

Lighting devices composed of decorative light strips now become a popular application trend for indoor decoration, outdoor building lighting, urban park lighting, exhibitions, shopping malls, and festival atmosphere lighting. There two different types of the decorative light strips in the market, one is a front-emitting type where a light emitting direction of a light strip is consistent with a light-output direction of a light bar, and another one is a side-emitting type where the light-output direction of the light bar is perpendicular to the light-emitting direction of the light strip, and light is emitted through a reflective surface.

Chinese patent No. CN217441434U discloses a neon lamp, including a light string, colorful light-transmitting caps, a light-transmitting layer, and an insulation wrapping layer, where the light string is composed of a plurality of printed circuit boards (PCBs) connected in series, each of the PCBs includes a welding area, and a surface mount light-emitting diode (LED) light source and/or a surface mount electronic component are welded to each welding area, each of the colorful light-transmitting caps defines an opening at a lower end thereof and covers a corresponding one of the PCBs, the light-transmitting layer defines an accommodating groove, the light-transmitting layer is disposed on the colorful light-transmitting caps, and the light-transmitting caps are all accommodated in the accommodating groove, and the insulation wrapping layer wraps the PCBs, the colorful light-transmitting caps, and the light-transmitting layer. A light emitting direction of the light string is consistent with a light-output direction of the neon lamp, that is, the neon lamp is of the front-emitting type, a light emitting surface of each LED light source on the corresponding one of the PCBs faces the light-transmitting layer and emits outward, which easily results in a center of each light emitting surface of a corresponding LED light source being brighter than edges, so that each LED light source is uneven in light emission.

Chinese patent No. CN213299686U discloses a side-emitting and side-bending neon lamp, including LED lamp beads, a flexible printed circuit board (FPCB), a diffusing portion, and a light-blocking portion, where the LED lamp beads are evenly distributed on the FPCB to form a light source strip, the light source strip is externally wrapped with the diffusing portion and the light-blocking portion, a surface of the light source strip where the LED lamp beads are distributed is a front surface of the light source strip, one side surface of the light source light is externally wrapped with the diffusing portion, and other portions of the light source light are externally wrapped with the light-blocking portion. A mirrored reflective film is additionally disposed on an inner wall surface of the light-blocking portion facing the light source strip, the front surface of the light source strip where the LED lamp beads are distributed is inclined at a small angle of 5°~10° toward the diffusing portion, which is inclined for a part of light to directly emit toward the diffusing portion. In this way, an angle at which the LED lamp beads are arranged has been adjusted to convert some of reflected light into direct light to emit outward, easily causing uneven light emission of a light emitting surface of the The prior art further discloses a lamp strip of the side-emitting type, as shown in FIGS. 17 and 18, a light bar is provided, including a flexible light shielding sleeve 1, a flexible scattering layer 2, and a flexible light strip 3, the flexible light shielding sleeve 1 is sleeved on the flexible scattering layer 2 for preventing light from being emitted outward from a bottom wall and side walls of the flexible scattering layer 2, so that the light may only emitted from one end of the flexible scattering layer 2, the flexible light strip 3 is disposed in the flexible scattering layer 2, a front LED chip 33 of the flexible light strip 3 emits light from a light emitting tunnel 4 to one of the side walls of the flexible scattering layer 2, the light is reflected and refracted multiple times in the flexible scattering layer 2 and then is emitted outward from a light-output portion of the flexible scattering layer 2. Although such a light strip structure avoids a light emitting direction of the flexible light strip being consistent with a light emitting direction of the light bar, most of the light emitted outward from the light-output portion of the flexible scattering layer 2 still easily causes a light emitting surface of the flexible light strip to be brighter at one side but dark at another side.

SUMMARY

In order to overcome defects in the prior art, the present disclosure provides a light-emitting diode (LED) light bar capable of refracting and scattering LED light, in which a light emitting direction of a flexible light strip is opposite to an illumination direction of the LED light bar. The LED light emitted by the flexible light strip undergoes multiple direct paths and refractions within the flexible scattering layer, and a light reflecting surface of the flexible light shielding sleeve improves light reflection efficiency, thereby enabling a more uniform and softer illumination effect of the LED light bar.

Technical solutions of the present disclosure are as follows.

The present disclosure provides the LED light bar, including a flexible light shielding sleeve, a flexible scattering layer, and a flexible light strip. The flexible light shielding sleeve extends along the LED light bar, the flexible light strip is disposed in the flexible scattering layer. A light emitting direction of the flexible light strip is opposite to an illumination direction of the LED light bar. The flexible scattering layer extends along the flexible light shielding sleeve and is disposed between the flexible light strip and the flexible light shielding sleeve.

Furthermore, the flexible light shielding sleeve is of a channel structure having a cross section being channel-shaped, an opening of the channel structure faces the illumination direction of the LED light bar. The flexible light strip extends along the flexible scattering layer, and a rear surface of the flexible light strip faces the opening of the channel structure.

Furthermore, a light incident wall of the flexible scattering layer is disposed between a light emitting surface of the flexible light strip and a bottom wall of the channel structure of the flexible light shielding sleeve, and the light incident wall is configured to receive LED light incident from the light emitting surface of flexible light strip. two light guiding walls of the flexible scattering layer are respectively disposed between a first side of the flexible light strip and a first side wall of the channel structure of the flexible light shielding sleeve and between a second side of the flexible light strip and a second side wall of the channel structure of the flexible light shielding sleeve, the two light guiding walls are respectively distributed from two ends of the light incident wall in a width direction thereof toward the opening of the channel structure of the flexible light shielding sleeve, the two light guiding walls are configured to propagate the LED light. Two ends of a scattering wall of the flexible scattering layer are connected across upper ends of the two light guiding walls of the flexible scattering layer, a cross-section of the scattering wall is an arc shape protruding outward from the opening of the channel structure of the flexible light shielding sleeve, the scattering wall is configured to scatter the LED light.

Furthermore, a light emitting tunnel is defined between the light emitting surface of the flexible light strip and the light incident wall of the flexible scattering layer, the light emitting tunnel extends along the LED light bar and is configured to refract the LED light.

Furthermore, a backlight tunnel is defined between the rear surface of the flexible light strip and the scattering wall of the flexible scattering layer, the backlight tunnel extends along the LED light bar and is configured to refract the LED light.

Furthermore, the light emitting tunnel and the backlight tunnel form an integrated channel in the flexible scattering layer, a cross section of the integrated channel is an elliptical shape, a major axis direction of the elliptical shape is substantially parallel to a width direction of the light incident wall.

Furthermore, a width of the flexible light strip is smaller than a length of a major axis of the elliptical shape and is larger than a length of a minor axis of the elliptical shape, so that a width direction of the flexible light strip is substantially parallel to the major axis direction of the elliptical shape.

Furthermore, an in-wall tunnel is further defined between the rear surface of the flexible light strip and the scattering wall of the flexible scattering layer, the in-wall tunnel extends along the LED light bar and is configured to refract the LED light. A light receiving wall is disposed between the in-wall tunnel and the backlight tunnel, and the light receiving wall is configured to isolate the in-wall tunnel from the backlight tunnel.

Furthermore, a compound tunnel extending parallel to the in-wall tunnel is disposed in the flexible scattering layer, the compound tunnel is configured to refract the LED light. A light transmitting wall is disposed between the compound tunnel and the in-wall tunnel, the light transmitting wall is configured to isolate the compound tunnel from the in-wall tunnel.

Furthermore, the scattering wall of the flexible scattering layer is an equal-thickness wall for uniformly scattering the LED light outward.

Furthermore, two ends of the cross section of the channel structure of the flexible light shielding sleeve respectively have two inclined edges, the two inclined edges form a first flared opening therebetween. Two sloping sides are respectively disposed at connections between the two light guiding walls of the flexible scattering layer and the scattering wall of the flexible scattering layer, the two sloping sides form a second flared opening therebetween. The two inclined edges are in close contact with the sloping sides to ensure a seamless connection between the flexible light shielding sleeve and the flexible scattering layer.

Furthermore, a cross section of the compound tunnel is a semicircular shape, and a length of a diameter edge of the semicircular shape is smaller than the length of the major axis of the elliptical shape.

Furthermore, both a width of a cross section of the in-wall tunnel and a maximum width of the cross section of the compound tunnel are smaller than the length of the major axis of the elliptical shape.

Furthermore, an inner surface of the bottom wall of the channel structure, an inner surface of the first side wall of the channel structure, and an inner surface of the second side wall of the channel structure form a light reflecting surface for reflecting a part of the LED light leaked from the light incident wall and the two light guiding walls.

Furthermore, strip-shaped grooves are respectively defined on an outer surface of the bottom wall of the channel structure, an outer surface of the first side wall of the channel structure, and an outer surface of the second side wall of the channel structure, the strip-shaped grooves extend along an extending direction of the LED light bar and are configured to prevent slipping.

Furthermore, front LED chips on the light emitting surface of the flexible light strip are spaced apart along the extending direction of the LED light bar.

Furthermore, rear LED chips on the rear surface of the flexible light strip are spaced apart along the extending direction of the LED light bar.

Furthermore, convex transparent layers are respectively wrapped on the front LED chips of the flexible light strip and the rear LED chips of the flexible light strip for scattering the LED light.

Furthermore, the light incident wall, the two light guiding wall, the light receiving wall, the light transmitting wall, and the scattering wall are integrally formed.

The present disclosure further provides a flexible neon lamp, including LED light bars each having the same structure of the LED light bar as foregoing. The flexible light strip of each of the LED light bars is connected to a corresponding flexible light strip of a next one of the LED light bars in series.

Furthermore, the flexible neon lamp further includes a power adapter, the power adapter is configured to supply power to the flexible light strip of each of the LED light bars.

Beneficial effects of the present disclosure are as follows.

According to the LED light bar and the flexible neon lamp of the present disclosure, the light emitting direction of the flexible light strip is opposite to the illumination direction of the LED light bar. The LED light emitted by the flexible light strip undergoes multiple reflections and refractions within the flexible scattering layer, and the light reflecting surface of the flexible light shielding sleeve is additionally provided to improve the light reflection efficiency, the LED light bar illuminates in a direction opposite to the light emitting direction of the flexible neon lamp, thereby enabling the more uniform and softer illumination effect of the LED light bar.

BRIEF DESCRIPTION OF DRAWINGS

In order to more clearly illustrate embodiments of the present disclosure or technical solutions in the prior art, accompanying drawings required in description of the embodiments or the prior art are briefly described below, and obviously, the accompanying drawings in the following description are merely some embodiments of the present disclosure, and for those who skilled in the art, other drawings may be obtained according to structures shown in these drawings without creative efforts.

Figure 1:
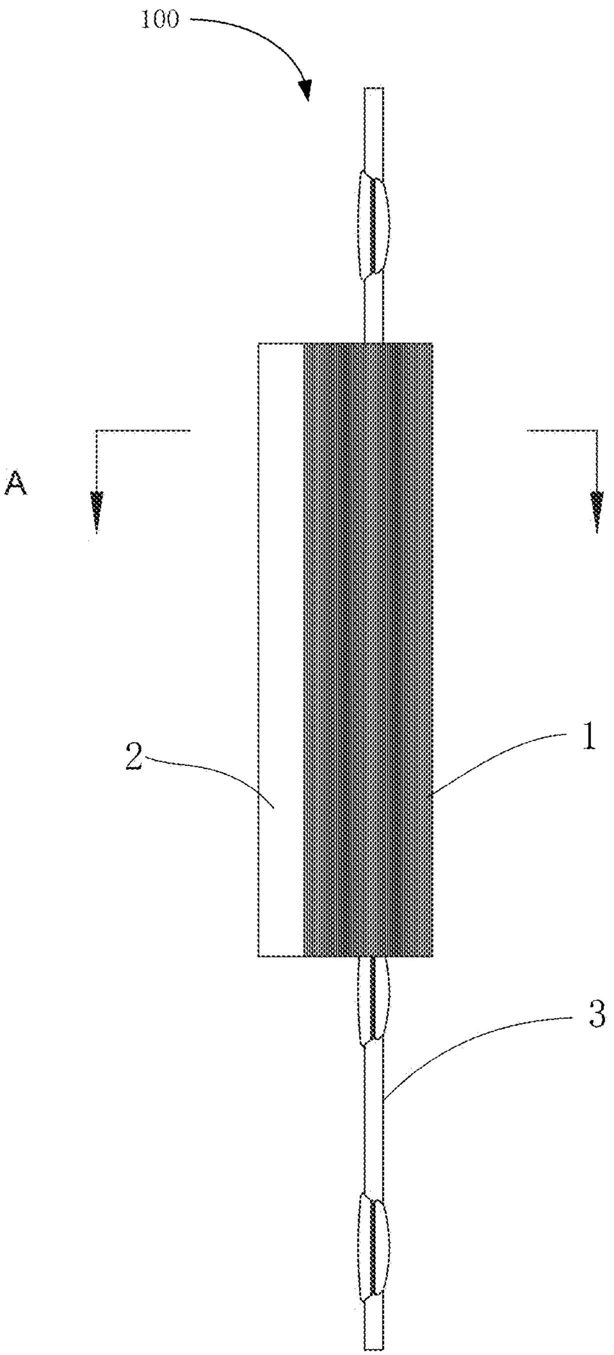
FIG. 1 is a structural schematic diagram of a light-emitting diode (LED) light bar according to a first embodiment and a third embodiment of the present disclosure.

Reference numerals in the drawings: 1. flexible light shielding sleeve; 11. bottom wall; 12. first side wall/second side wall; 13. inclined edge; 14. strip-shaped groove; 15. light reflecting surface; 2. flexible scattering layer; 21. light incident wall; 22. light guiding wall; 23. scattering wall; 24. light transmitting wall; 25. sloping side; 26. light receiving wall; 3. flexible light strip; 31. light emitting surface; 32. rear surface; 33. front LED chip; 34. rear LED chip; 35. convex transparent layer; 4. light emitting tunnel; 5. backlight tunnel; 6. in-wall tunnel; 7. compound tunnel; 100. LED light bar; 200. waterproof connector; 300. power adapter.

DETAILED DESCRIPTION OF EMBODIMENTS

Technical solutions in embodiments of the present disclosure are clearly and completely described below with reference to accompanying drawings in the embodiments of the present disclosure. All other embodiments obtained by those who skilled in the art based on the embodiments of the present disclosure without creative efforts shall fall within a protection scope of the present disclosure.

First Embodiment

Figure 2:
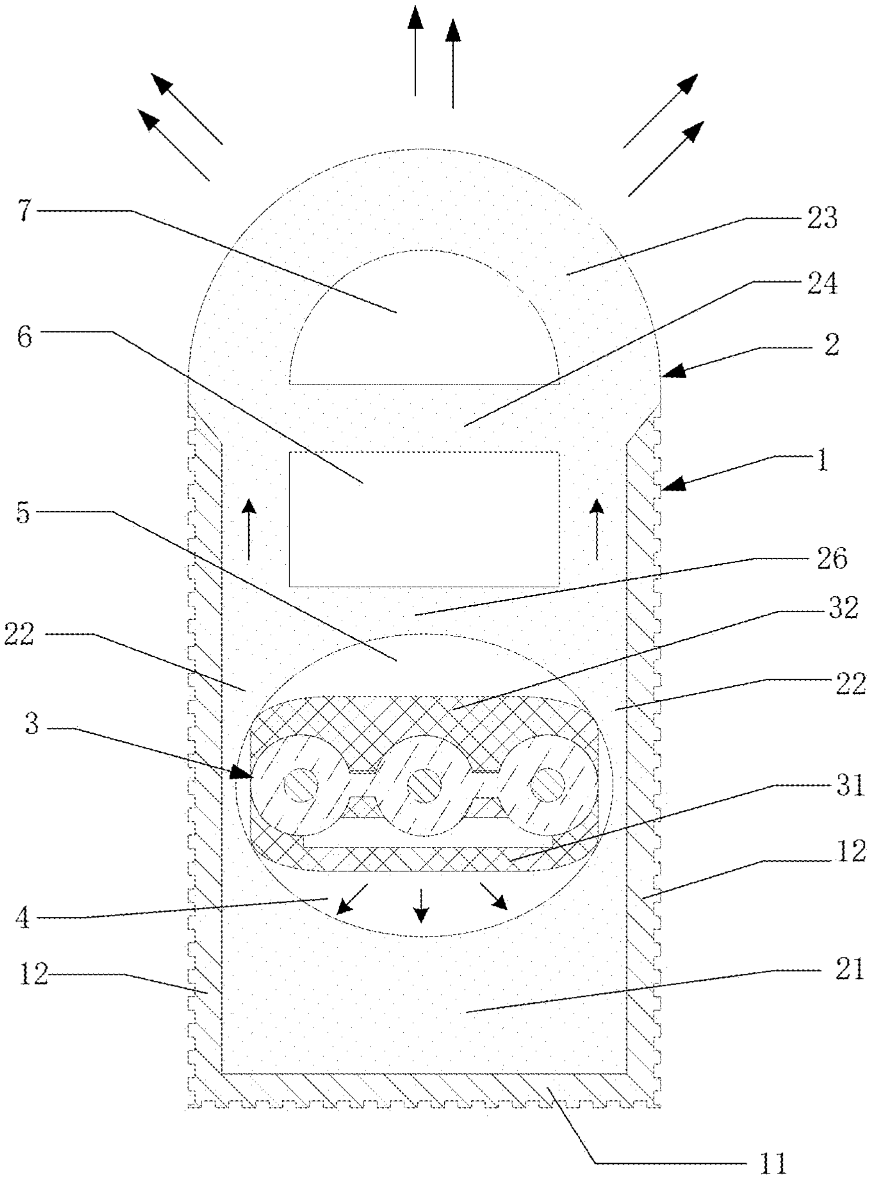
FIG. 2 is a cross-sectional schematic diagram taken along the line A-A shown in FIG. 1.

Please refer to FIGS. 1-2, the present disclosure provides the LED light bar 100, including a flexible light shielding sleeve 1, a flexible scattering layer 2, and a flexible light strip 3. The flexible light shielding sleeve 1 extends along the LED light bar 100, the flexible light strip 3 is disposed in the flexible scattering layer 2. A light emitting direction of the flexible light strip 3 is opposite to an illumination direction of the LED light bar 100. The flexible scattering layer 2 extends along the flexible light shielding sleeve 1 and is disposed between the flexible light strip 3 and the flexible light shielding sleeve 1. Since the light emitting direction of the flexible light strip 3 is opposite to the illumination direction of the LED light bar 100, LED light emitted by the flexible light strip 3 undergoes multiple reflections and refractions within the flexible scattering layer 2, and the LED light emitted by the flexible light strip 3 is prevented from directly illuminating in a direction of the LED light strip, thereby avoiding an issue where a center of the LED light bar is brighter than edges.

As shown in FIG. 2, the flexible light shielding sleeve 1 is of a channel structure having a cross section being channel-shaped, the channel structure includes a bottom wall 11, a first side wall 12, and a second side wall 12, the first side wall 12 of the channel structure and the second side wall 12 of the channel structure respectively extend upward from two ends of the bottom wall 11 of the channel structure, and an opening of the channel structure faces the illumination direction of the LED light bar 100. The flexible light strip 3 extends along the flexible scattering layer 2, and a rear surface 32 of the flexible light strip 3 faces the opening of the channel structure. The flexible light shielding sleeve 1 is made of an opaque material, such as opaque plastic, and the bottom wall 11 of the flexible light shielding sleeve 1, the first side wall of the flexible light shielding sleeve 1, and the second side wall of the flexible light shielding sleeve 1 is configured to block the LED light, so that the LED light emitted by the flexible light strip 3 is only emitted from the opening of the channel structure of the flexible light shielding sleeve 1, the flexible scattering layer 2 is disposed between the flexible light strip 3 and the flexible light shielding sleeve 1, and the LED light is only emitted from a scattering wall 23 of the flexible scattering layer 2.

The flexible scattering layer 2 extends along the flexible light shielding sleeve 1 and is disposed between the flexible light strip 3 and the flexible light shielding sleeve 1. The flexible scattering layer 2 is made of a light transmitting material, such as transparent silicone gel or transparent plastic, and the flexible scattering layer 2 includes a light incident wall 21, two light guiding walls 22, and a scattering wall 23. The light incident wall 21 of the flexible scattering layer 2 is disposed between a light emitting surface 31 of the flexible light strip 3 and the bottom wall 11 of the channel structure of the flexible light shielding sleeve 1, and the light incident wall 21 is configured to receive LED light incident from the light emitting surface 31 of flexible light strip 3. The two light guiding walls 22 of the flexible scattering layer 2 are respectively disposed between a first side of the flexible light strip 3 and the first side wall 12 of the channel structure of the flexible light shielding sleeve 1 and between a second side of the flexible light strip 3 and the second side wall 12 of the channel structure of the flexible light shielding sleeve 1, the two light guiding walls are respectively distributed from two ends of the light incident wall 21 in a width direction thereof toward the opening of the channel structure of the flexible light shielding sleeve 1, the two light guiding walls are configured to propagate the LED light. Two ends of a scattering wall 23 of the flexible scattering layer 2 are connected across upper ends of the two light guiding walls of the flexible scattering layer 2, a cross-section of the scattering wall 23 is an arc shape protruding outward from the opening of the channel structure of the flexible light shielding sleeve 1, the scattering wall 23 is configured to scatter the LED light. In one embodiment, the scattering wall 23 of the flexible scattering layer 2 is an equal-thickness wall, thickness consistency of the scattering wall 23 of the flexible scattering layer 2 is beneficial for uniformly scattering the LED light outward.

It should be noted that the flexible scattering layer 2 is made of the light transmitting material, the flexible light shielding sleeve 1 is made of the opaque material, in some embodiments, the flexible scattering layer 2 and the flexible light shielding sleeve 1 are separated, in some other embodiment, the flexible scattering layer 2 and the flexible light shielding sleeve 1 are formed by a bicolor co-extrusion process, so that the flexible scattering layer 2 and the flexible light shielding sleeve 1 are integrally formed, cost of assembly production is reduced.

Figure 3:
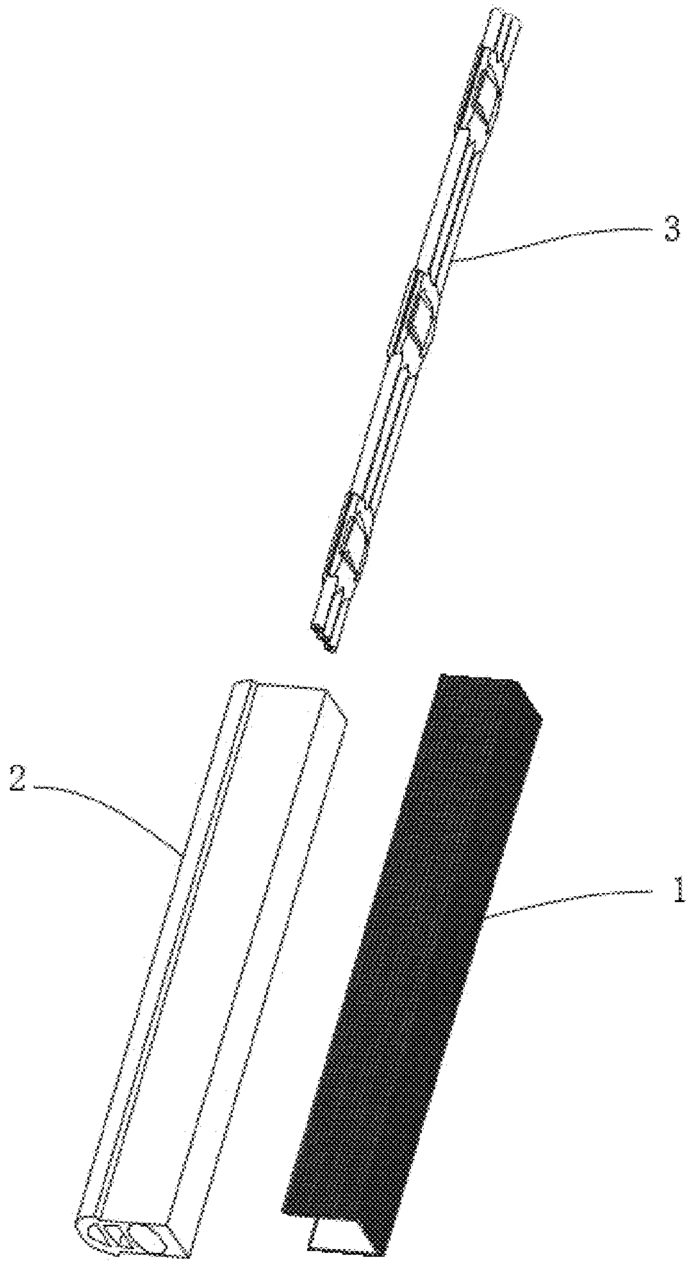
FIG. 3 is an exploded schematic diagram of the LED light bar according to the first embodiment of the present disclosure.

As shown in FIGS. 2-3, a light emitting tunnel 4 is defined between the light emitting surface 31 of the flexible light strip 3 and the light incident wall 21 of the flexible scattering layer 2, the light emitting tunnel 4 extends along the LED light bar 100 and is configured to refract the LED light, a backlight tunnel 5 is defined between the rear surface 32 of the flexible light strip 3 and the scattering wall 23 of the flexible scattering layer 2, the backlight tunnel 5 extends along the LED light bar 100 and is configured to refract the LED light. The light emitting tunnel 4 and the backlight tunnel 5 form an integrated channel in the flexible scattering layer 2, a cross section of the integrated channel is an elliptical shape, so the integrated channel is also referred to as an elliptical channel, an elliptical structure is capable of increasing strength and preventing tunnel collapse, a major axis direction of the elliptical shape is substantially parallel to a width direction of the light incident wall 21. It should be noted that the elliptical channel is configured to accommodate the flexible light strip 3, the flexible light strip 3 divides the elliptical channel into the light emitting tunnel 4 and the backlight tunnel 5 and isolates the light emitting tunnel 4 from the backlight tunnel 5, the light emitting surface 31 of the flexible light strip 3 faces the light emitting tunnel 4, the rear surface 32 of the flexible light strip 3 faces the backlight tunnel 5, and when mounting the flexible light strip 3, the light emitting surface 31 of the flexible light strip 3 faces the light emitting tunnel 4, so that the LED light emitted by the light emitting surface 31 of the flexible light strip 3 is emitted from the light emitting tunnel 4 to the light incident wall 21 of the flexible scattering layer 2.

Please refer to FIG. 2, the flexible light strip 3 is accommodated in the elliptical channel of the flexible scattering layer 2, a width of the flexible light strip 3 is smaller than a length of a major axis of the elliptical shape and is larger than a length of a minor axis of the elliptical shape, so that a width direction of the flexible light strip 3 is substantially parallel to the major axis direction of the elliptical shape, and the light emitting surface 31 of the flexible light strip 3 faces the bottom wall 11 of the channel structure of the flexible light shielding sleeve 1. Since the width of the flexible light strip 3 is larger than the length of the minor axis of the elliptical shape, the flexible light strip 3 is prevented from turning over in the elliptical channel, thereby ensuring that the light emitting direction of the flexible light strip 3 is opposite to the illumination direction of the LED light bar 100, in addition, a structure of the elliptical channel is also beneficial to heat dissipation when the flexible light strip 3 emits the LED light, thereby prolonging a service life of the LED light bar 100.

As shown in FIGS. 2-3, an in-wall tunnel 6 is further defined between the rear surface 32 of the flexible light strip 3 and the scattering wall 23 of the flexible scattering layer 2, the in-wall tunnel 6 extends along the LED light bar 100 and is configured to refract the LED light. A light receiving wall 26 is disposed between the in-wall tunnel 6 and the backlight tunnel 5, and the light receiving wall 26 is configured to isolate the in-wall tunnel 6 from the backlight tunnel 5. A compound tunnel 7 extending parallel to the in-wall tunnel 6 is disposed in the flexible scattering layer 2, the compound tunnel 7 is configured to refract the LED light. A light transmitting wall 24 is disposed between the compound tunnel 7 and the in-wall tunnel 6, the light transmitting wall 24 is configured to isolate the compound tunnel 7 from the in-wall tunnel 6. As shown in FIG. 2, in the flexible scattering layer 2, from the light incident wall 21 to the scattering wall 23, the integrated channel formed by the light emitting tunnel 4 and the backlight tunnel 5, the in-wall tunnel 6, and the compound tunnel 7 are arranged in sequence and are all filled with air mediums for light propagation, and the LED light emitted by the light emitting surface 31 of the flexible light strip 3 is refracted between flexible scattering layer mediums and the air mediums As shown in FIG. 2, in the embodiment, a cross section of the in-wall tunnel 4 is a rectangle, a polygon, or a circle, and is preferably the rectangle. A cross section of the compound tunnel 7 is a semicircular shape, and a length of a diameter edge of the semicircular shape is smaller than the length of the major axis of the elliptical shape. Both a width of a cross section of the in-wall tunnel 6 and a maximum width of the cross section of the compound tunnel 7 are smaller than the length of the major axis of the elliptical shape.

As shown in FIG. 2, the bottom wall 11 of the channel structure of the flexible light shielding sleeve 1, the first side wall 12 of the channel structure of the flexible light shielding sleeve 1, and the second side wall 12 of the channel structure of the flexible light shielding sleeve 1 are respectively wrapped around the light incident wall 21 of the flexible scattering layer 2 and the two light guiding walls 22 of the flexible scattering layer 2 to prevent LED light emitted by front LED chips 33 of the flexible light strip 3 from being emitted outward from the light incident wall 21 of the flexible scattering layer 2 and the two light guiding walls 22 of the flexible scattering layer 2, so that the LED light emitted by the front LED chips 33 is only emitted outward from the scattering wall 23 located at the opening of the channel structure of the flexible light shielding sleeve 1.

An inner surface of the bottom wall 11 of the channel structure, an inner surface of the first side wall 12 of the channel structure, and an inner surface of the second side wall 12 of the channel structure form a light reflecting surface 15, the light reflecting surface 15 is capable of reflecting the LED light propagating through the light incident wall 21 and the two light guiding walls 22, so that the light reflecting surface 15 is configured to reflect a part of the LED light leaked from the light incident wall 21 and the two light guiding walls 22 to finally emit the LED light outward from the scattering wall 23 of the flexible scattering layer 2, in this way, an illumination effect of the LED light bar 100 is improved, and illumination requirements of the LED light bar 100 are met.

Figure 4:
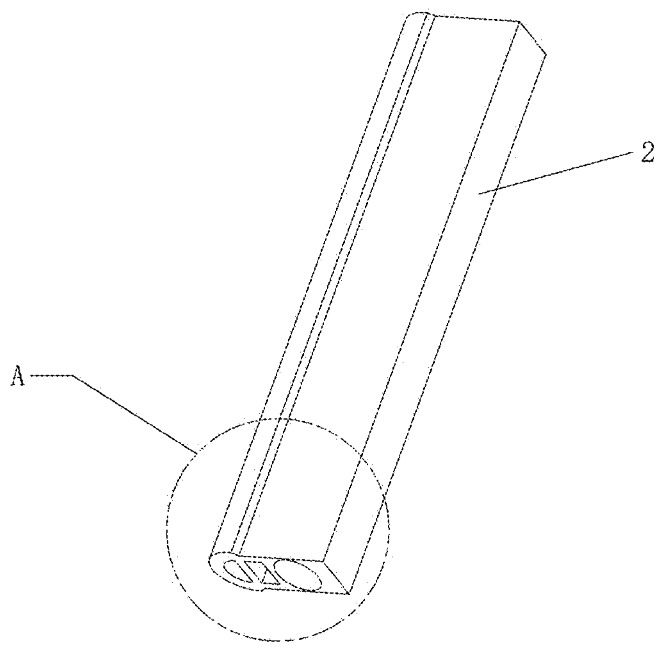
FIG. 4 is a structural schematic diagram of a flexible scattering layer of the LED light bar according to the first embodiment of the present disclosure.
Figure 5:
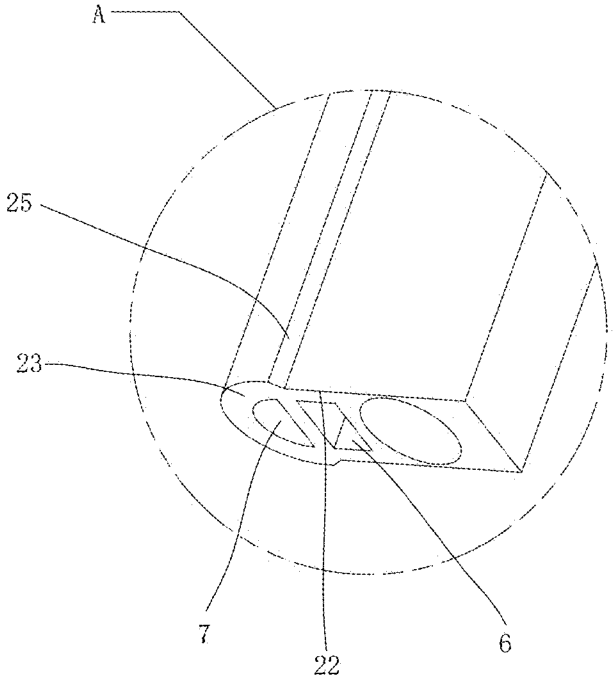
FIG. 5 is an enlarged schematic diagram of portion A shown in FIG. 4.
Figure 6:
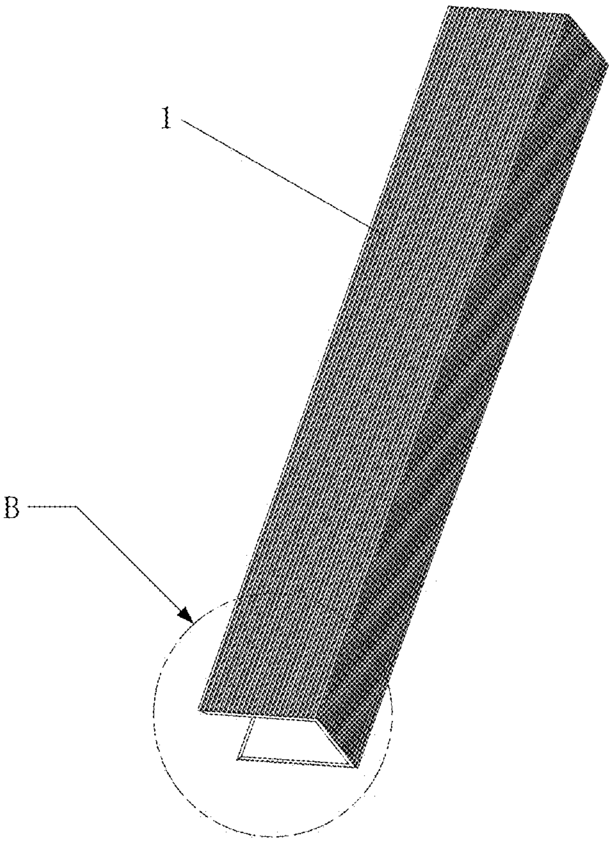
FIG. 6 is a structural schematic diagram of a flexible light shielding sleeve of the LED light bar according to the first embodiment of the present disclosure.
Figure 7:
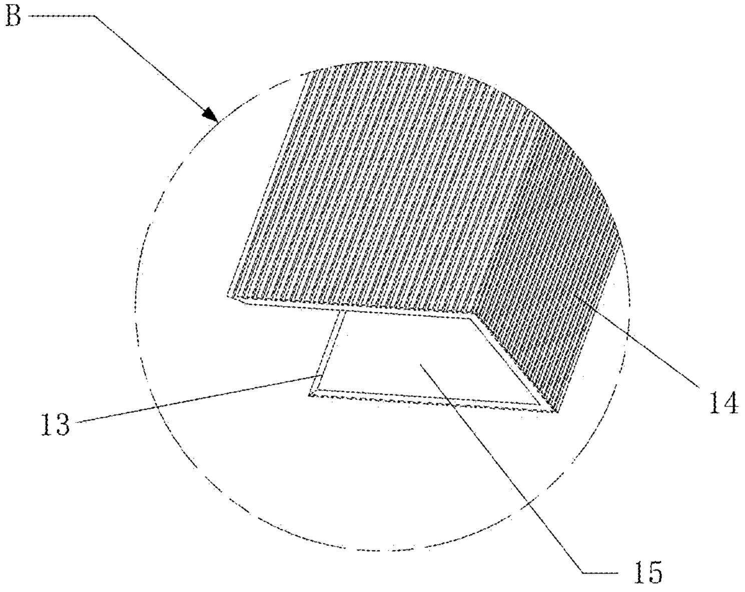
FIG. 7 is an enlarged schematic diagram of portion B shown in FIG. 6.
Figure 8:
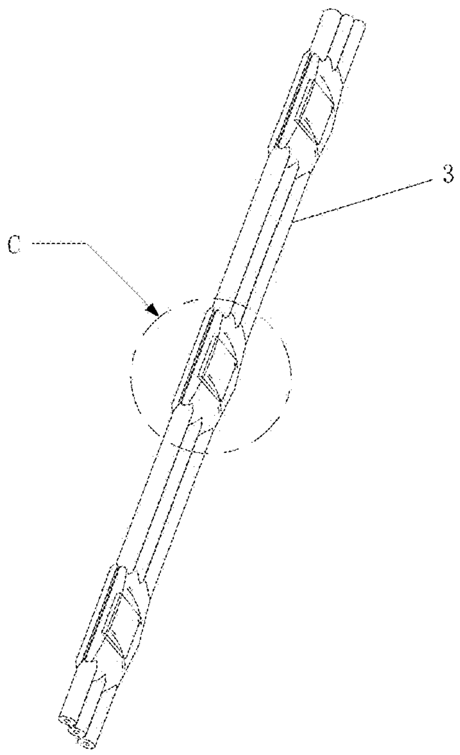
FIG. 8 is a structural schematic diagram of a flexible light strip of the LED light bar according to the first embodiment of the present disclosure.
Figure 9:
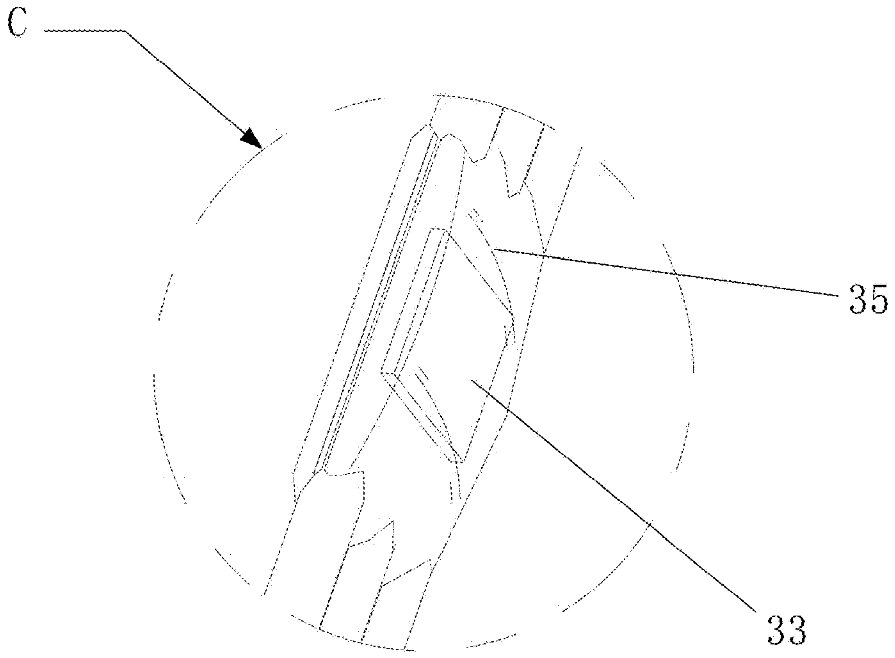
FIG. 9 is an enlarged schematic diagram of portion C shown in FIG. 8.

As shown in FIGS. 4-5, the light incident wall 21, the two light guiding walls 22, the light receiving wall 26, the light transmitting wall 24, and the scattering wall 23 are integrally formed. As shown in FIGS. 6-7, two ends of the cross section of the channel structure of the flexible light shielding sleeve 1 respectively have two inclined edges 13, the two inclined edges 13 form a first flared opening therebetween. Two sloping sides 25 are respectively disposed at connections between the two light guiding walls 22 of the flexible scattering layer 2 and the scattering wall 23 of the flexible scattering layer 2, the two sloping sides 25 form a second flared opening therebetween. The two inclined edges 13 are in close contact with the sloping sides 25 to ensure a seamless connection between the flexible light shielding sleeve 1 and the flexible scattering layer 2. On the one hand, the flexible light shielding sleeve 1 and the flexible scattering layer 2 are connected at a seam, and on the other hand, the opening of the channel structure of the flexible light shielding sleeve 1 is prevented from scratching a surface of the flexible scattering layer 2, thereby avoiding cracking of the flexible scattering layer 2. Strip-shaped grooves 14 are respectively defined on an outer surface of the bottom wall 11 of the channel structure, an outer surface of the first side wall 12 of the channel structure, and an outer surface of the second side wall 12 of the channel structure, the strip-shaped grooves 14 extend along an extending direction of the LED light bar 100 and are configured to prevent slipping when the flexible light shielding sleeve 1 and the flexible scattering layer 2 are connected at the seam. The inner surface of the bottom wall 11 of the channel structure, the inner surface of the first side wall 12 of the channel structure, and the inner surface of the second side wall 12 of the channel structure form the light reflecting surface 15 for reflecting the part of the LED light leaked from the light incident wall 21 and the two light guiding walls 22.

As shown in FIGS. 1, 2, 8, and 9, the front LED chips 33 on the light emitting surface 31 of the flexible light strip 3 are spaced apart along the extending direction of the LED light bar 100. The front LED chips 33 serve as illumination light sources, such as LED lamp beads, and the number of the front LED chips 33 on the light emitting surface 31 of the flexible light strip 3 is selected to adapt to a length and arrangement requirements of the flexible light strip 3. The flexible lamp strip 3 is flexible, which is designed to be bend-resistant and to more conveniently pass through the elliptical channel of the flexible scattering layer 2. Each of the front LED chips 33 of the flexible light strip 3 is wrapped with a corresponding one of convex transparent layers 35, corresponding convex transparent layers 35 are respectively wrap on the front LED chips 33 for scattering the LED light emitted by the front LED chips 33.

Figure 10:
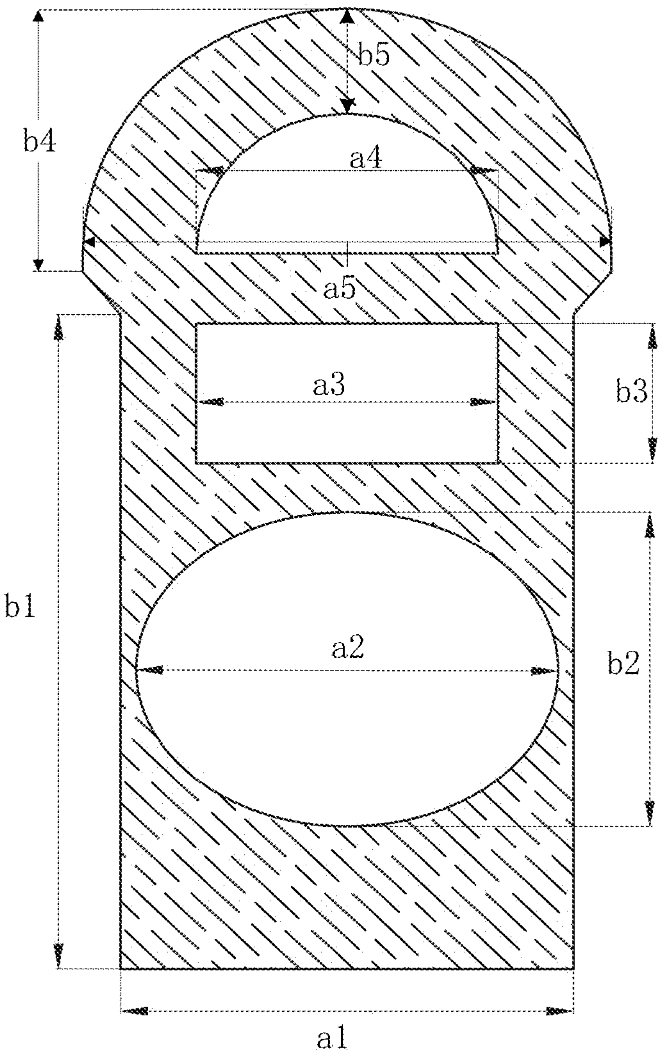
FIG. 10 is a cross-sectional schematic diagram of the flexible scattering layer of the LED light bar according to the first embodiment of the present disclosure.

As shown in FIGS. 2 and 10, the flexible scattering layer 2 includes the light incident wall 21, the light guiding walls 22, the scattering wall 23, the light transmitting wall 24, the light receiving wall 26, the elliptical channel, the in-wall tunnel 6, and the compound wall 7. The major axis of the elliptical shape is a2, and the minor axis of the elliptical shape is b2; a length of the cross section of the in-wall tunnel 6 is a3, and a width of the cross section of the in-wall tunnel 6 is b3; and the diameter edge of the semicircular shape is a4. Two ends of a width a1 of the light incident wall 21 respectively extend toward the opening of the channel structure of the flexible light shielding sleeve 1 to form the two light guiding walls 22, an outer surface of each of the two light guiding walls 22 is flush with surfaces of the two ends of the width a1 of the light incident wall 21, and the scattering wall 23 is located on the upper portion of the flexible scattering layer 2, the two ends of the scattering wall 23 of the flexible scattering layer 2 are connected across the upper ends of the two light guiding walls of the flexible scattering layer 2. The scattering wall 23 of the flexible scattering layer 2 is the equal-thickness wall, a wall thickness thereof is b5, the equal-thickness wall is beneficial for uniformly scattering the LED light outward, thereby enabling a more uniform and softer illumination effect of the LED light bar 100.

It should be noted that shapes of the cross sections of the integrated channel, the in-wall tunnel 6, and the compound tunnel 7 disposed in the flexible scattering layer 2 are only preferred embodiments, and are not intended to limit the shapes of the cross sections.

Optical principles indicate that a phenomenon that light changes direction of propagation at an interface between two materials and returns to an original material is called as light reflection. In the embodiment, as shown in FIG. 2, the light incident wall 21 of the flexible scattering layer 2, the outer surface of each of the two light guiding walls 22, the inner surface of the bottom wall 11 of the channel structure, the inner surface of the first side wall 12 of the channel structure, and the inner surface of the second side wall 12 of the channel structure are interfaces for the LED light propagation, therefore, when light propagating in the light incident wall 21 and the two light guiding walls 22 propagates to the flexible light shielding sleeve 1, a propagation direction of light is changed at a corresponding interface and returned to the light incident wall 21 and the two light guiding walls 22.

The optical principles further indicate that when light travels from one medium into another at an angle, a direction of propagation thereof deflects, and this phenomenon is called as light refraction. The light refraction occurs at an interface between two transparent media. When the light travels from one transparent medium into another at the angle, the direction of the propagation thereof changes due to different speeds of the light in the two transparent media. The light refraction also involves a concept of the refractive index, the refractive index is a physical quantity that measures a degree of refraction. The refractive index is a ratio of the sine of an incidence angle to the sine of a refraction angle, and the refractive index is also an inverse ratio of a speed of light in an incident medium to a speed of light in a refracted medium. According to Snell's Law, when the light travels from a medium with a higher speed of light to a medium with a lower speed of light, a light ray bends toward the normal; on the contrary, the light ray bends away from the normal. Therefore, when the light travels from one medium into another at the angle, the direction of the propagation thereof may change.

In the embodiment, at an interface of the light emitting tunnel 4 (belonging to the air mediums) and the light incident wall 21 (belonging to the flexible scattering layer mediums), interfaces of the two light guiding walls 22 (belonging to the flexible scattering layer mediums) of the flexible scattering layer 2 and the in-wall tunnel 6 (belonging to the air mediums), an interface of the in-wall tunnel 6 (belonging to the air mediums) and a light transmitting wall 24 (belong to the flexible scattering layer mediums), an interface of the light transmitting wall 24 (belonging to the flexible scattering layer mediums) and the compound tunnel 7 (belonging to the air mediums), an interface between the compound tunnel 7 (belonging to the air mediums) and the scattering wall 23 (belonging to the flexible scattering layer mediums), an interface of the elliptical channel (belonging to the air mediums) formed by the lighting emitting tunnel 4 and the backlight tunnel 5 and the flexible scattering layer 2 (belonging to the flexible scattering layer mediums), when the light travels from one tedium into another at the angle, the direction of the propagation thereof changes due to different speeds of the light in the two media, thereby leading to the light refraction.

The optical principles further indicate that light travels in a direct path through a homogeneous medium, which is known as rectilinear propagation of light. In the embodiment, the light propagates through the flexible scattering layer 2 including the light incident wall 21, the two light guiding walls 22, the light receiving wall 26, the scattering wall 23, and the light transmitting wall 24. The flexible scattering layer 2 is made of the transparent silicone gel. The light respectively propagates through the air mediums within the light emitting tunnel 4, the backlight tunnel 5, the in-wall tunnel 6, and the compound tunnel 7 in the flexible scattering layer 2. It should be noted that the light travels in the direct path through the homogeneous medium, but the flexible scattering layer mediums typically contains impurities, so that the light does not travel in the direct path within the flexible scattering layer mediums and instead undergoes refraction.

As shown in FIG. 2, the LED light emitted by the front LED chips 33 on the emitting surface 31 of the flexible light strip 3 undergoes multiple reflections, rectilinear propagation, and refraction. Finally, the LED light is scattered outward from the scattering wall 23 of the flexible scattering layer 2, thereby ensuring the more uniform and softer illumination effect of the LED light bar 100.

Second Embodiment

Figure 11:
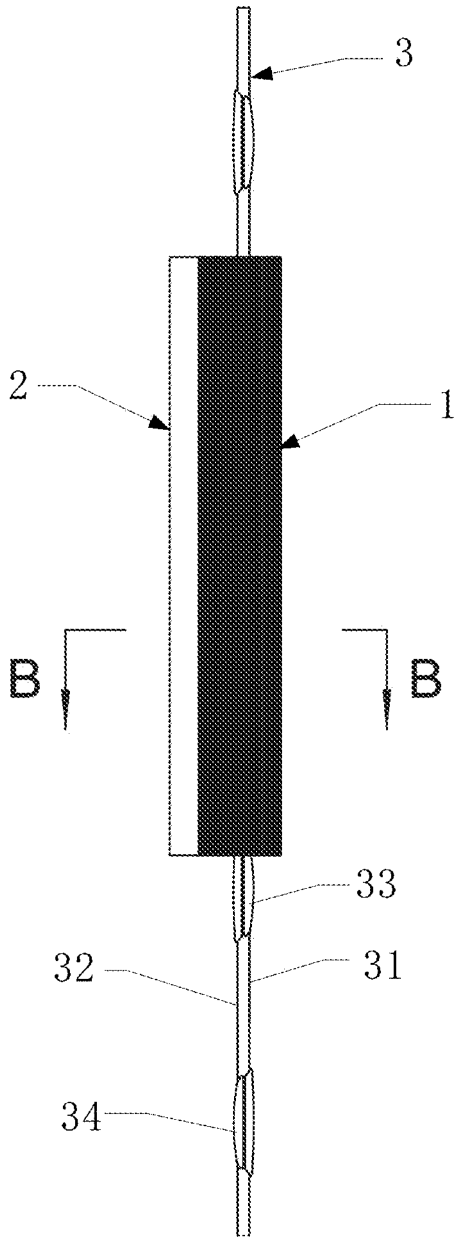
FIG. 11 is a structural schematic diagram of the LED light bar according to the second embodiment of the present disclosure.
Figure 12:
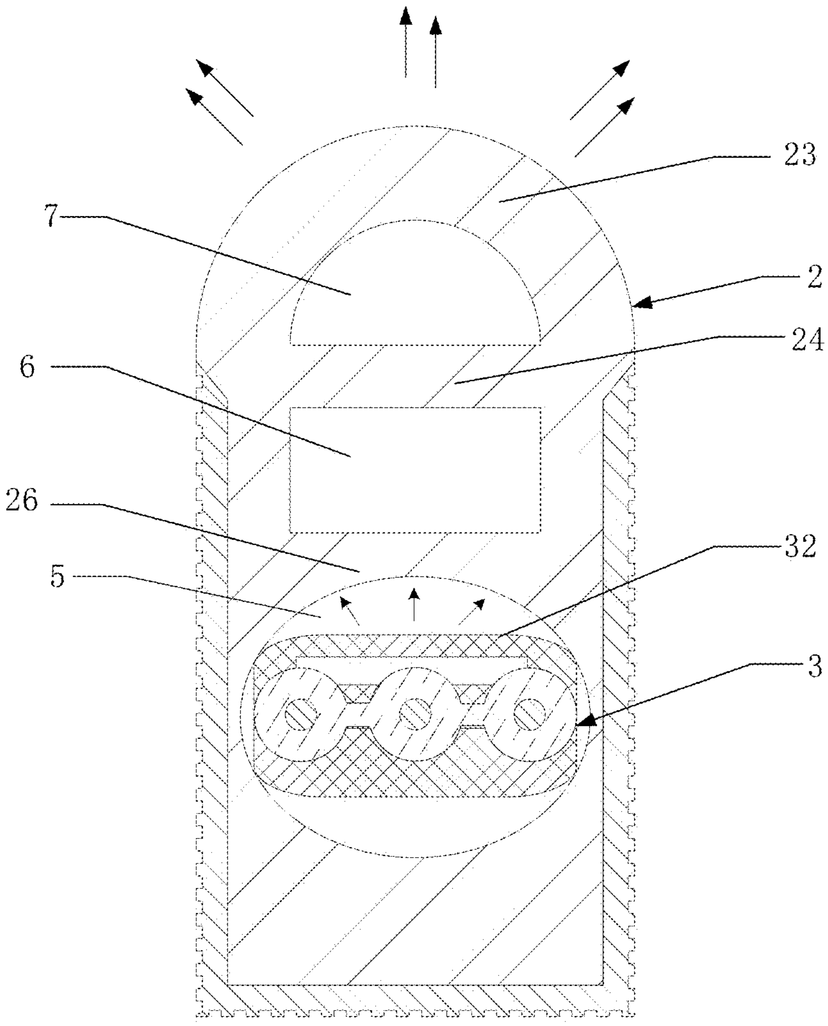
FIG. 12 is a cross-sectional schematic diagram taken along the line B-B shown in FIG. 11.
Figure 13:
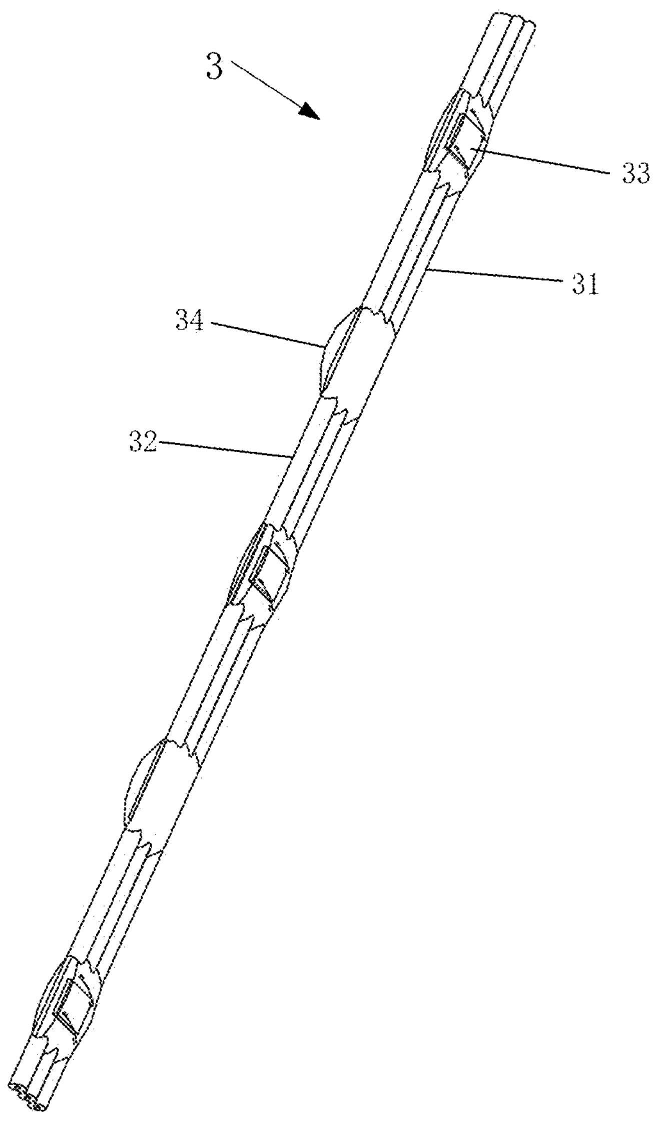
FIG. 13 is a structural schematic diagram of the flexible light strip of the LED light bar according to the second embodiment of the present disclosure.

Please refer to FIGS. 11-13, main difference between the second embodiment and the first embodiment lies in that rear LED chips 34 on the rear surface 32 of the flexible light strip 3 are spaced apart along the extending direction of the LED light bar 100. The rear LED chips 34 on the rear surface 32 of the flexible light strip 3 and the front LED chips 33 on the light emitting surface 31 of the flexible light strip 3 are alternately distributed in a staggered manner. Therefore, light spots emitted by the LED light bar 100 are more uniform.

LED light emitted by the rear LED chips 34 on the rear surface 32 of the flexible light strip 3 is incident on a lower surface of the light receiving wall 26, and the light refraction occurs at all of an interface of the backlight tunnel 5 (belonging to the air mediums) and the light receiving wall 26 (belonging to the flexible scattering layer mediums), an interface of the light receiving wall 26 (belonging to the flexible scattering layer mediums) and the in-wall tunnel 6 (belonging to the air mediums), an interface of the in-wall tunnel 6 (belonging to the air mediums) and the light transmitting wall 24 (belonging to the flexible scattering layer mediums), an interface of the light transmitting wall 24 (belonging to the flexible scattering layer mediums) and the compound tunnel 7 (belonging to the air mediums), an interface of the compound tunnel 7 (belonging to the air mediums) and the scattering wall 23 (belonging to the flexible scattering layer mediums), and an interface of the scattering wall 23 (belonging to the flexible scattering layer mediums) and external air. Finally, the LED light is scattered outward from the scattering wall 23 of the flexible scattering layer 2, thereby emitting more LED light and ensuring a more uniform and brighter effect of the LED light bar 100.

Third Embodiment

Figure 14:
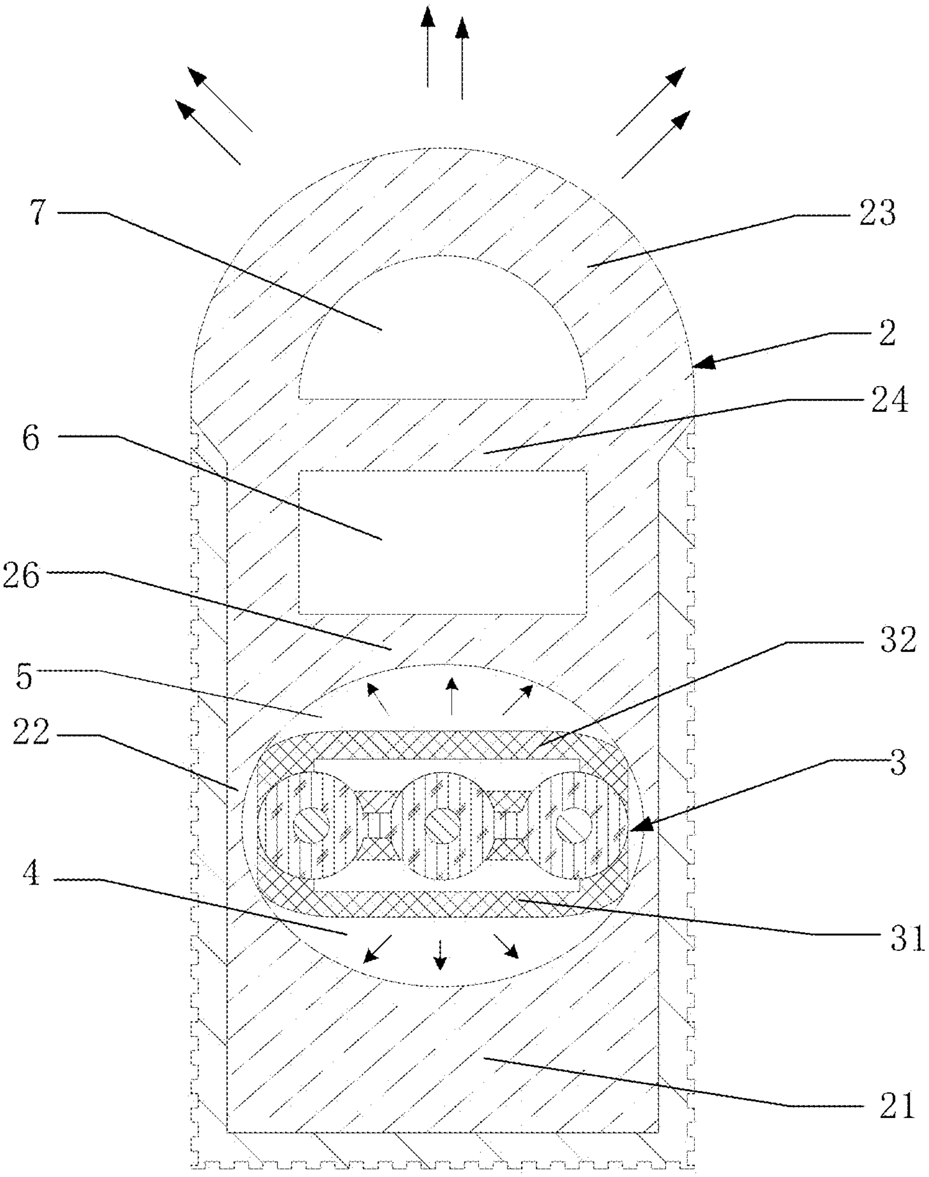
FIG. 14 is a cross-sectional schematic diagram of the LED light bar according to the third embodiment of the present disclosure.
Figure 15:
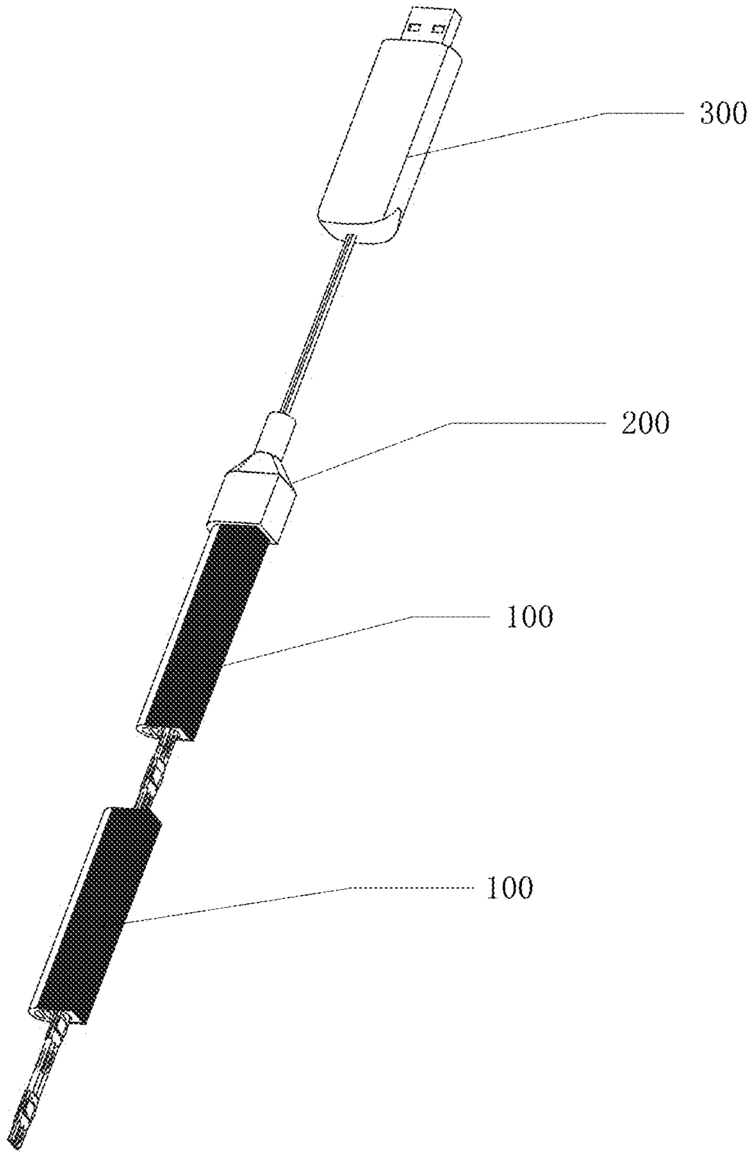
FIG. 15 is a structural schematic diagram of a flexible neon lamp according to a fourth embodiment of the present disclosure.
Figure 16:
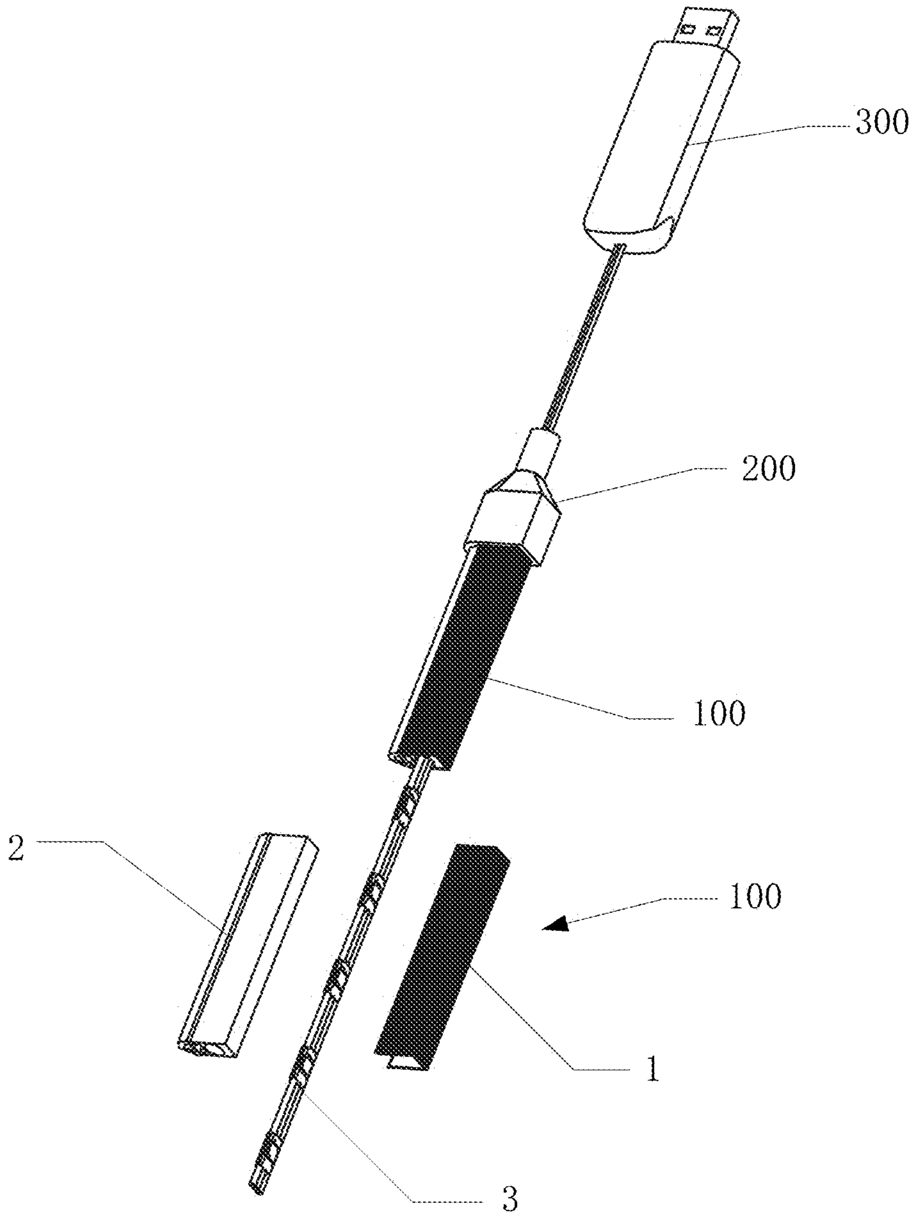
FIG. 16 is a partial exploded schematic diagram of the flexible neon lamp according to the fourth embodiment of the present disclosure.
Figure 17:
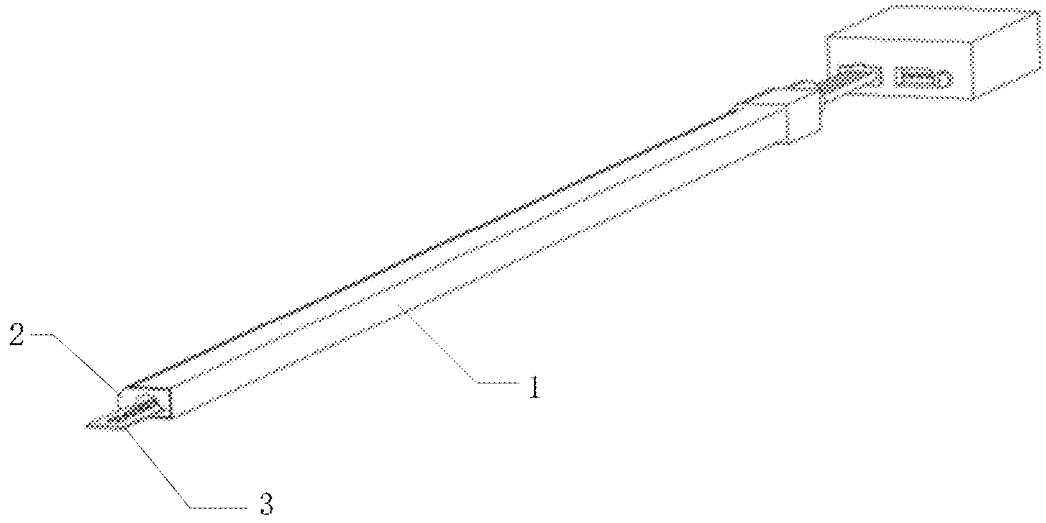
FIG. 17 is a structural schematic diagram of a light bar in the prior art.
Figure 18:
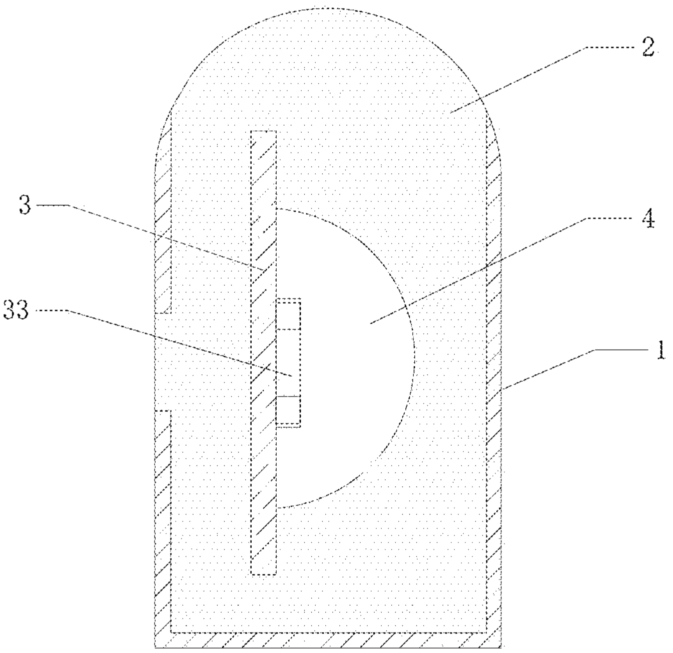
FIG. 18 is a partial cross-sectional schematic diagram of the light bar shown in FIG. 17.

Please refer to FIG. 14, main difference between the THIRD embodiment and the first embodiment lies in that the rear LED chips 34 on the rear surface 32 of the flexible light strip 3 are spaced apart along the extending direction of the LED light bar 100. The rear LED chips 34 on the rear surface 32 of the flexible light strip 3 are distributed in correspondence with the front LED chips 33 on the emitting surface 31 of the flexible light strip 3. The LED light emitted by the rear LED chips 34 on the rear surface 32 of the flexible light strip 3 is incident on the lower surface of the light receiving wall 26, while the LED light emitted by the front LED chips 33 on the emitting surface 31 of the flexible light strip 3 is incident on an upper surface of the light incident wall 21. Therefore, the light spots emitted by the LED light bar 100 are more uniform and brightness of the LED light bar 100 is higher.

In the embodiment, all of the front LED chips 33 and the rear LED chips 34 respectively on the emitting surface of the flexible light strip 3 and on lower surface of the flexible light strip 3 are capable of emit the LED light. The LED light emitted by the front LED chips 33 on the light emitting surface 31 of the flexible light strip 3 is incident on the upper surface of the light incident wall 21. The LED light emitted by the rear LED chip 33 on the back surface 32 of the flexible light strip 3 is incident on the lower surface of the light receiving wall 26. The light refraction occurs at all of an interface of the light emitting tunnel 4 (belonging to the air mediums) and the light incident wall 21 (belonging to the flexible scattering layer mediums), an interface of the two light guiding walls 22 (belonging to the flexible scattering layer mediums) of the flexible scattering layer 2 and the in-wall tunnel 6 (belonging to the air mediums), an interface of the backlight tunnel 5 (belonging to the air mediums) and the light receiving wall 26 (belonging to the flexible scattering layer mediums), an interface of the light receiving wall 26 (belonging to the flexible scattering layer mediums) and the in-wall tunnel 6 (belonging to the air mediums), an interface of the in-wall tunnel 6 (belonging to the air mediums) and the light transmitting wall 24 (belonging to the flexible scattering layer mediums), an interface of the light transmitting wall 24 (belonging to the flexible scattering layer mediums) and the compound tunnel 7 (belonging to the air mediums), an interface of the compound tunnel 7 (belonging to the air mediums) and the scattering wall 23 (belonging to the flexible scattering layer mediums), and an interface of the scattering wall 23 (belonging to the flexible scattering layer mediums) and the external air. Finally, the LED light is scattered outward from the scattering wall 23 of the flexible scattering layer 2, thereby emitting more LED light and ensuring the more uniform and brighter effect of the LED light bar 100.

Fourth Embodiment

Please refer to FIGS. 1-2 and 15-16, the present disclosure provides a flexible neon lamp, including LED light bars 100 each having the same structure of the LED light bar 100 as foregoing, a waterproof connector 200, and a power adapter 300. The LED light bars 100 include flexible light strips 3, the flexible light strips 3 are connected in series to form a light band, a first end of the waterproof connector 200 is fixedly connected to one end of the light band, and a second end of the waterproof connector 200 is electrically connected to the power adapter 300.

In the embodiment, the light band passes through the elliptical channel of the flexible scattering layer 2 of each of the LED light bars 100, the light emitting surface 31 of each flexible light strip 3 faces the light receiving wall 21 of a corresponding flexible scattering layer 2, each flexible light shielding sleeve 1 is sleeved on the corresponding flexible scattering layer 2, the LED light leaked from a corresponding light incident wall 21 and corresponding two light guiding walls 22 are reflected at the bottom wall 11 of a corresponding flexible light shielding sleeve 1, the first side wall 12 of the corresponding flexible light shielding sleeve 1, and the second side wall 12 of the corresponding flexible light shielding sleeve 1. The LED light emitted by a corresponding flexible light strip 3 is emitted only through the scattering wall 23 of the corresponding flexible scattering layer 2. The LED light emitted by the corresponding flexible light strip 3 undergoes multiple reflections and refractions within the corresponding flexible scattering layer 2, thereby avoiding an issue where a center of the flexible neon lamp is brighter than edges when being powered on.

The above are only preferred embodiments of the present disclosure and are not intended to limit the present disclosure, and any modification, equivalent replacement and improvement made within a spirit and a principle of the present disclosure shall fall within a protection scope of the present disclosure.

What is claimed is:

1. A light-emitting diode (LED) light bar, comprising:
- a flexible light shielding sleeve;
- a flexible scattering layer; and
- a flexible light strip;
- wherein the flexible light shielding sleeve extends along the LED light bar, the flexible light strip is disposed in the flexible scattering layer;
- a light emitting direction of the flexible light strip is opposite to an illumination direction of the LED light bar; and
- the flexible scattering layer extends along the flexible light shielding sleeve and is disposed between the flexible light strip and the flexible light shielding sleeve.

2. The LED light bar according to claim 1, wherein the flexible light shielding sleeve is of a channel structure having a cross section being channel-shaped, an opening of the channel structure faces the illumination direction of the LED light bar; and
- the flexible light strip extends along the flexible scattering layer, and a rear surface of the flexible light strip faces the opening of the channel structure.

3. The LED light bar according to claim 2, wherein a light incident wall of the flexible scattering layer is disposed between a light emitting surface of the flexible light strip and a bottom wall of the channel structure of the flexible light shielding sleeve, and the light incident wall is configured to receive LED light incident from the light emitting surface of flexible light strip;
- two light guiding walls of the flexible scattering layer are respectively disposed between a first side of the flexible light strip and a first side wall of the channel structure of the flexible light shielding sleeve and between a second side of the flexible light strip and a second side wall of the channel structure of the flexible light shielding sleeve, the two light guiding walls are respectively distributed from two ends of the light incident wall in a width direction thereof toward the opening of the channel structure of the flexible light shielding sleeve, the two light guiding walls are configured to propagate the LED light; and
- two ends of a scattering wall of the flexible scattering layer are connected across upper ends of the two light guiding walls of the flexible scattering layer, a cross-section of the scattering wall is an arc shape protruding outward from the opening of the channel structure of the flexible light shielding sleeve, the scattering wall is configured to scatter the LED light.

4. The LED light bar according to claim 3, wherein a light emitting tunnel is defined between the light emitting surface of the flexible light strip and the light incident wall of the flexible scattering layer, the light emitting tunnel extends along the LED light bar and is configured to refract the LED light.

5. The LED light bar according to claim 4, wherein a backlight tunnel is defined between the rear surface of the flexible light strip and the scattering wall of the flexible scattering layer, the backlight tunnel extends along the LED light bar and is configured to refract the LED light.

6. The LED light bar according to claim 5, wherein the light emitting tunnel and the backlight tunnel form an integrated channel in the flexible scattering layer, a cross section of the integrated channel is an elliptical shape, a major axis direction of the elliptical shape is substantially parallel to a width direction of the light incident wall.

7. The LED light bar according to claim 6, wherein a width of the flexible light strip is smaller than a length of a major axis of the elliptical shape and is larger than a length of a minor axis of the elliptical shape, so that a width direction of the flexible light strip is substantially parallel to the major axis direction of the elliptical shape.

8. The LED light bar according to claim 7, wherein an in-wall tunnel is further defined between the rear surface of the flexible light strip and the scattering wall of the flexible scattering layer, the in-wall tunnel extends along the LED light bar and is configured to refract the LED light; and
- a light receiving wall is disposed between the in-wall tunnel and the backlight tunnel, and the light receiving wall is configured to isolate the in-wall tunnel from the backlight tunnel.

9. The LED light bar according to claim 8, wherein a compound tunnel extending parallel to the in-wall tunnel is disposed in the flexible scattering layer, the compound tunnel is configured to refract the LED light; and
- a light transmitting wall is disposed between the compound tunnel and the in-wall tunnel, the light transmitting wall is configured to isolate the compound tunnel from the in-wall tunnel.

10. The LED light bar according to claim 9, wherein the scattering wall of the flexible scattering layer is an equal-thickness wall for uniformly scattering the LED light outward.

11. The LED light bar according to claim 10, wherein two ends of the cross section of the channel structure of the flexible light shielding sleeve respectively have two inclined edges, the two inclined edges form a first flared opening therebetween;
- two sloping sides are respectively disposed at connections between the two light guiding walls of the flexible scattering layer and the scattering wall of the flexible scattering layer, the two sloping sides form a second flared opening therebetween; and the two inclined edges are in close contact with the sloping sides to ensure a seamless connection between the flexible light shielding sleeve and the flexible scattering layer.

12. The LED light bar according to claim 11, wherein a cross section of the compound tunnel is a semicircular shape, and a length of a diameter edge of the semicircular shape is smaller than the length of the major axis of the elliptical shape.

13. The LED light bar according to claim 12, wherein both a width of a cross section of the in-wall tunnel and a maximum width of the cross section of the compound tunnel are smaller than the length of the major axis of the elliptical shape.

14. The LED light bar according to claim 13, wherein an inner surface of the bottom wall of the channel structure, an inner surface of the first side wall of the channel structure, and an inner surface of the second side wall of the channel structure form a light reflecting surface for reflecting a part of the LED light leaked from the light incident wall and the two light guiding walls.

15. The LED light bar according to claim 14, wherein strip-shaped grooves are respectively defined on an outer surface of the bottom wall of the channel structure, an outer surface of the first side wall of the channel structure, and an outer surface of the second side wall of the channel structure, the strip-shaped grooves extend along an extending direction of the LED light bar and are configured to prevent slipping.

16. The LED light bar according to claim 15, wherein front LED chips on the light emitting surface of the flexible light strip are spaced apart along the extending direction of the LED light bar.

17. The LED light bar according to claim 16, wherein rear LED chips on the rear surface of the flexible light strip are spaced apart along the extending direction of the LED light bar.

18. The LED light bar according to claim 17, wherein convex transparent layers are respectively wrapped on the front LED chips of the flexible light strip and the rear LED chips of the flexible light strip for scattering the LED light.

19. The LED light bar according to claim 18, wherein the light incident wall, the two light guiding wall, the light receiving wall, the light transmitting wall, and the scattering wall are integrally formed.

20. A flexible neon lamp, comprising:

LED light bars; and a power adapter wherein each of the LED light bars comprises a flexible light shielding sleeve, a flexible scattering layer, and a flexible light strip;

each flexible light shielding sleeve extends along a corresponding one of the LED light bars, each flexible light strip is disposed in a corresponding flexible scattering layer;

a light emitting direction of each flexible light strip is opposite to an illumination direction of the corresponding one of the LED light bars;

each flexible scattering layer extends along a corresponding flexible light shielding sleeve and is disposed between the corresponding flexible light strip and the corresponding flexible light shielding sleeve;

the flexible light strip of each of the LED light bars is connected to a corresponding flexible light strip of a next one of the LED light bars in series; and the power adapter is configured to supply power to the flexible light strip of each of the LED light bars.

* * * * *